United States Patent Office 3,072,596
Patented Jan. 8, 1963

3,072,596
COMPOSITION COMPRISING A POLYVINYL ACETAL, A PHENOL-ALDEHYDE RESIN, A MELAMINE-ALDEHYDE RESIN, A POLYURETHANE AND, AS A CURE PROMOTER, AN ORGANIC COMPOUND OF TIN OR IRON, AND ELECTRICAL CONDUCTOR COATED THEREWITH
Edward Lavin, Longmeadow, Albert H. Markhart, Wilbraham, and Charles F. Hunt, Springfield, Mass., assignors to Shawinigan Resins Corporation, Springfield, Mass., a corporation of Massachusetts
No Drawing. Filed Mar. 8, 1960, Ser. No. 13,445
16 Claims. (Cl. 260—45.1)

This invention relates to polyvinyl acetal compositions especially adapted to serve as electrical insulation for metals. More particularly, the invention relates to compositions of polyvinyl acetals with certain polyurethanes, phenolic resins, and melamine resins, which compositions having improved curability characteristics, and to wires coated with the cured compositions.

The heat-cured products of polyvinyl acetal resins modified with certain polyurethanes, phenolic resins and melamine resins have been found to provide excellent electrical insulation. Such polyvinyl acetal compositions are disclosed in the applications of Edward Lavin, and Albert H. Markhart, Serial No. 823,373, filed June 29, 1959, and Edward Lavin, Albert H. Markhart and Robert E. Kass, Serial No. 5,664, filed February 1, 1960. Those compositions comprise 100 parts polyvinyl acetal, 20-200 parts polyurethane, 0.5-20 parts of a melamine resin and varying amounts of from 1-30 parts of a phenol-aldehyde resin, said compositions possessing good flexibility, abrasion resistance, thermal stability, and improved resistance to organic solvents especially refrigerants, for example, monochlorodifluoromethane and transformer oils, for example, the askarels.

Although the above mentioned compositions have improved the quality compared to polyvinyl acetal-phenol aldehyde type electrical insulation, the curability characteristics of the compositions still present difficulty. Because of the rate of cure varies for the particular resinous components of the compositions, it has been found that the range of curing conditions for all of the included compositions is a relatively narrow one. In addition, the cure temperatures for the compositions are higher than for the commonly employed polyvinyl acetals modified with phenol-aldehyde resins, and also the required cure period found to be more extensive. Since all of these factors increase the cost of insulation to the user, this naturally restricts the sale thereof, despite the desirable properties achieved with the cured compositions. We have discovered that the addition of a further modifying agent to these compositions materially increases the curing range and accordingly permits the cured products to be made at a considerably lower cost than heretofore possible. Another unexpected benefit resulting from the addition of the cure promoter to the system has been the improvement in the solvent resistance of the cured coating.

Our invention, stated briefly, is a modified polyvinyl acetal composition comprising 100 parts polyvinyl acetal, 5-200 parts polyurethane, 0.5-20 parts of the melamine resin, 1-150 parts of the phenol-aldehyde resin, and 0.01-2 parts of a cure promoter. Effective cure promoters comprise particular soluble metal organic compounds selected from the group containing tin, and/or iron. It has also been discovered that the addition of particular amines namely, tertiary amines in combination with the named cure promoters, produces a further improvement of the monochlorodifluoromethane solvent resistance.

This invention is illustrated in its preferred embodiment in the following examples and subsequent discussions thereon but is not limited thereto. Where parts and percentages are shown hereinafter in the specification and in the claims, they are parts and percentages by weight unless otherwise specified.

EXAMPLE 1

A polyvinyl formal resin was used having the following analysis:

10½% acetate groups calculated as polyvinyl acetate
6% hydroxyl groups calculated as polyvinyl alcohol
83½% formal groups calculated as polyvinyl formal (by difference)

100 parts of the above resin together with 60 parts of the polyurethane represented by the formula:

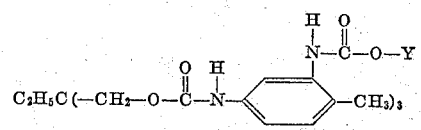

where Y is a phenyl group, along with 5 parts of a phenol-aldehyde resin, added as a 50% solution in cresylic acid, 5 parts of a melamine-formaldehyde condensate resin, added as a 67% solution in xylene, and 0.12 part dibutyltin dilaurate were added to a solvent mixture comprising 430 parts of naphtha and 255 parts of cresylic acid. The resin additions were made in a suitable container at room temperature with moderate agitation. An amber colored solution was obtained having a total solids of approximately 18 percent and the viscosity of 5500 centipoises at 25° C.

Six coats of this enamel were applied to No. 18 magnet wire by running the wire through the solution by conventional means. After each coating, the wire was passed through a vertical oven 12 feet high for curing, the hottest portion of the oven being approximately 4 feet long and having a temperature of about 350° C. The increase in thickness of the wire due to th einsulative coating was approximately 3 mils total build. The enameled wires were cured at different travel speeds of the wire through the vertical oven to demonstrate the range of cure possible for the present compositions. The results of tests on the properties of the cured products, along with like results for comparison, of cured products not containing the cure promoter are shown in Table I below:

Table I

|  | With Cure Promoter | | | | | Without Cure Promoter | | | | |
|---|---|---|---|---|---|---|---|---|---|---|
| Speed, ft./min. | 12 | 14 | 16 | 18 | 20 | 10.5 | 12 | 14 | 16 | 18 |
| Build, mils | 2.8 | 2.9 | 3.0 | 3.0 | 3.1 | 2.8 | 2.9 | 3.0 | 3.0 | 3.1 |
| Flexibility | 1 | 1 | 1 | 1 | 1 | 1 | 1 | 1 | 1 | 1 |
| Toluene-MeOH extractibles (percent) | 0.4 | 0.2 | 0.3 | 0.8 | 1.6 | 1.5 | 0.9 | 0.6 | 0.9 | 2.1 |
| Monochlorodifluoromethane extractibles (percent) | 0.2 | 0.3 | 0.3 | 0.7 | 1.3 | 1.0 | 0.6 | 0.6 | 0.7 | 1.4 |

It can be seen from the above results that the solvent resistance obtained for the composition of Example 1 as measured by the toluene methanol extractibles and monochlorodifluoromethane extractibles over cure speeds ranging from 12 to 18 feet per minute is not obtained in the cured compositions without the cured promoter except at 14 feet per minute.

EXAMPLE 2

To illustrate the similar effects of the cure promoter upon other compositions of the present invention, 0.09 part dibutyltin diacetate was added to an 18% solids wire enamel containing the resinous materials of Example 1 in the proportions of 100 parts polyvinyl acetal, 45 parts polyurethane, 40 parts phenol-aldehyde resin and 7.5 parts melamine-formaldehyde condensate resin. Thereafter enameled wires were prepared according to the method described in that example. The results of properties tests on the heat-cured products of this composition along with control samples not containing the cure promoter are shown in tabular form below:

*Table II*

|  | With Cure Promoter | | | | | Without Cure Promoter | | |
|---|---|---|---|---|---|---|---|---|
| Speed, ft./min | 12 | 14 | 16 | 18 | 20 | 12 | 14 | 16 |
| Build, mils | 2.8 | 3.0 | 3.0 | 3.1 | 3.1 | 2.9 | 3.0 | 3.1 |
| Flexibility | 2 | 1 | 1 | 1 | 1 | 2 | 1 | 1 |
| Toluene-MeOH extractibles (percent) | 0.3 | 0.3 | 0.4 | 0.6 | 1.8 | 0.1 | 0.2 | 0.7 |
| Monochlorodifluoromethane extractibles (percent) | 0.1 | 0.1 | 0.3 | 0.4 | 1.1 | 0.7 | 0.8 | 1.1 |

Again it will be seen from the above results that comparative solvent resistance is obtained for the cured products of the compositions containing the cure promoter over a travel speed range from 12–18 feet per minute, as compared with a cure range of only 12–14 feet per minute for the composition without the cure promoter.

EXAMPLES 3–5

To illustrate the limits of cure promoter level in the modified polyvinyl acetal composition which produces the beneficial effects described, various concentrations of the dibutyltin diacetate compound were added to the coating compositions of Example 1 and the properties of the cured products determined, with the results obtained reported in tabular form below:

*Table III*

| Example | 3 | | | 4 | | | 5 | | |
|---|---|---|---|---|---|---|---|---|---|
| Polyvinyl formal | 100 | | | 100 | | | 100 | | |
| Polyurethane | 60 | | | 60 | | | 60 | | |
| Phenol-aldehyde | 5 | | | 5 | | | 5 | | |
| Melamine-formaldehyde | 5 | | | 5 | | | 5 | | |
| Dibutyltin diacetate | 0.03 | | | 0.48 | | | 2.0 | | |
| Speed, ft./min | 12 | 14 | 16 | 12 | 14 | 16 | 12 | 14 | 16 |
| Build, mils | 2.8 | 2.9 | 3.0 | 2.8 | 3.0 | 3.1 | 2.8 | 2.9 | 3.0 |
| Flexibility | 1 | 1 | 1 | 1 | 1 | 1 | 1 | 1 | 1 |
| Toluene-MeOH extractibles (percent) | 0.3 | 0.2 | 0.4 | 0.8 | 0.3 | 0.2 | 1.5 | 1.6 | ------ |
| Monochlorodifluoromethane extractibles (percent) | 0.1 | 0.1 | 0.1 | 0.4 | 0.4 | 0.4 | 0.5 | 0.3 | 0.2 |

Although it will be noted from the above results that the toluene-methanol extractibles for the cured products were not as low as those obtained heretofore by use of the cure promoter, the monochlorodifluoromethane extractibles were lower than had been obtained for any compositions not containing the cure promoter.

EXAMPLE 6

Iron-naphthanate (containing approximately 6% by weight Fe) was added to the modified polyvinyl acetal composition of Example 1 and enameled wires prepared according to the method described therein. The results obtained with this cure promoter are represented in tabular form below:

*Table IV*

| Speed, ft./min | 10.5 | 12 | 14 | 16 | 18 |
|---|---|---|---|---|---|
| Build, mils | 2.8 | 2.9 | 3.0 | 3.0 | 3.1 |
| Flexibility | 2 | 1 | 1 | 1 | 1 |
| Toluene-MeOH extractibles (percent) | 1.4 | 0.7 | 0.4 | 0.4 | 1.0 |
| Monochlorodifluoromethane extractibles (percent) | 0.6 | 0.3 | 0.2 | 0.3 | 1.0 |

It will be seen from the above results that the particular iron cure promoter used produced results comparable with the tin promoter used heretofore, and further, that the wide range of cure is again obtained.

EXAMPLES 7–9

To illustrate the further improvement in the solvent resistance of the cured compositions containing a tertiary amine as well as the cure promoter, enameled wires were prepared according to Example 1 with the results obtained indicated in tabular form below:

*Table V*

| Example | 7 | | | | | 8 | 9 | | | | |
|---|---|---|---|---|---|---|---|---|---|---|---|
| Polyvinyl formal | 100 | | | | | 100 | 100 | | | | |
| Polyurethane | 60 | | | | | 60 | 60 | | | | |
| Phenol-aldehyde | 5 | | | | | 5 | 5 | | | | |
| Melamine-aldehyde | 5 | | | | | 5 | 5 | | | | |
| Dibutyltin dilaurate | 0.05 | | | | | ------ | 0.05 | | | | |
| Triethylenediamine | ------ | | | | | 1.0 | 0.05 | | | | |
| Speed, ft./min | 10.5 | 12 | 14 | 16 | 18 | 14 | 10.5 | 12 | 14 | 16 | 18 |
| Toluene-MeOH extractibles (percent) | 1.2 | 0.6 | 0.3 | 0.7 | 1.4 | 0.2 | 1.0 | 0.5 | 0.3 | 0.6 | 1.3 |
| Monochlorodifluoromethane extractibles (percent) | 0.5 | 0.2 | 0.2 | 0.5 | 1.0 | 0.6 | 0.3 | 0.1 | 0.1 | 0.4 | 0.9 |

The improvement is particularly noticeable in the monochlorodifluoromethane extractibles reported above whereby the results of Example 9 containing both dibutyltin dilaurate and triethylenediamine are uniformly lower than for any results of the Example 7 and Example 8 not having both additives.

The properties tests reported in the Examples 1–9 were made in the following manner:

FLEXIBILITY

The flexibility of the cured coating was measured by a modified A.S.A. (American Standards Association) procedure whereby the coated wire is wrapped around circular mandrels of the same diameter as the wire or multiple diameters thereof, after having been elongated approximately 25% of its length. The particular A.S.A. test which has been modified by the 25% elongation of the test speciman is A.S.A. C9.5–1955: 5.2.1.2. According to this test, the smallest diameter mandrel about which the elongated coated wire can be wrapped for ten turns without visible cracks or ruptures is reported. For example, a report of 1 signifies that the sample will pass on the mandrel of the same diameter as the wire being tested, while a report of 2 signifies that the coating may not be wrapped around a mandrel smaller than twice the diameter of the wire without failure within ten turns.

ABRASION RESISTANCE

The A.S.A. abrasion resistance test (A.S.A. C9.5–1955: 5.2.3) is performed by scraping the wire coating (under a 700 gram load) on a standard machine tester until contact is made with the metal wire substrate. The reported value is the number of strokes made upon the coating by the blade of the tester before contact is made with said metal wire substrate.

TOLUENE-METHANOL EXTRACTIBLES

Weighed specimens are immersed successively in boiling reagent grade toluene and reagent grade methanol for a period of two hours immersion in each solvent. The samples are then dried and re-weighed, whereupon the amount of coating which has been extracted during the successive immersions is calculated and reported on a percentage loss basis.

MONOCHLORODIFLUOROMETHANE EXTRACTIBLES

Weighed specimens are immersed in the liquid refrigerant for a period of 16 hours. The immersion is conducted in a bomb in order to keep the normally gaseous refrigerant in a liquid state, and the test conditions for the bomb are 205–240 p.s.i. and 37–43° C. The test specimens are removed after the immersion period, dried and re-weighed. The amount of extractibles obtained from the coating is calculated on a percentage weight loss basis.

The cured products of this invention are the solid reaction products of 100 parts by weight of a polyvinyl acetal, 5–200 parts of a polyurethane, 1–150 parts of a phenol-aldehyde resin, 0.5–20 parts of a melamine-aldehyde resin and 0.01–2 parts of a cure promoter selected from the class of soluble metal organic compounds of tin and iron. Optionally, even further improved results can be obtained by the incorporation of a tertiary amine in the composition in the same parts range used for the cure promoter. For the best balance of properties required for wire coating compositions, the preferred composition comprises 100 parts of polyvinyl formal, 40–80 parts of the polyurethane, 5–70 parts of the phenol-aldehyde resin, 1–10 parts of the melamine-aldehyde condensate resin, and 0.03–0.5 part each of the cure promoter and a tertiary amine.

The cure promoters of the present invention can be selected from the general class of metal organic compounds of tin and iron which are soluble in the solvents employed for the preparation of the wire enamels. Suitable metal organic compounds include the organic acid salts of tin and iron, tetrabutyltin, and dibutyltin oxide. The most effective cure promoters have been found to be the organic acid salts of tin and iron. Useful cure promoters from the preferred class of tin and iron salts include both the lower and higher valence forms of the metallic ions and in addition to the salts disclosed in the preceding examples include stannous octoate, ferric acetate, ferrous octoate, ferric naphthanate and ferric laurate.

In order to be utilizable in the practice of the present invention the tertiary amines must also be soluble in the solvents employed for the preparation of the wire enamels. Suitable tertiary amines, in addition to the triethylenediamine employed in Example 9, include N-methylmorpholine as well as N-ethylmorpholine, N-dimethylpiperazine and tributylamine.

The polyurethane materials of this invention are adducts of organic polyisocyanates having the isocyanate groups reacted with the reactive hydrogen of another organic compound. The adduct portion of the polyurethane is removed by the elevated temperatures of the cure reaction, permitting the remining polyisocyanate to crosslink the resinous composition. Suitable polyisocyanates include compounds such as phenylene diisocyanates, diphenylene diisocyanates, tolylene diisocyanates, naphthylene diisocyanates, diphenylmethane diisocyanates, cyclohexane diisocyanates, ethylene diisocyanate, tetramethylene diisocyanate, hexamethylene diisocyanate, polyaryl polyisocyanates, trimers of polyisocyanates, polyisocyanates which are the reaction products of diisocyanates or triisocyanates with polyhydric alcohols, and the like, and mixtures, trimers, and isomers thereof.

The simplest class of useful polyisocyanates can be represented by the following formula:

where R represents a member of the class consisting of aliphatic hydrocarbons containing up to 8 carbon atoms, aromatic hydrocarbons containing up to 13 carbon atoms, alicyclic hydrocarbons containing up to 6 carbon atoms, and alkyl-aryl substitutes thereof, and $n$ is an integer from 2–4. Typical trimers of the useful polyisocyanates can be illustrated by the following general formula:

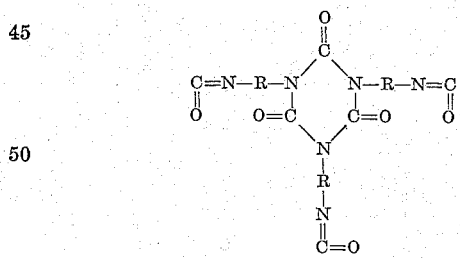

where R is the same as defined in the above formula for the polyisocyanates. Typical examples of the reaction products of polyisocyanates with polyhydric alcohols can be illustrated by the following general formula:

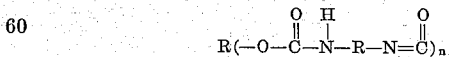

where R is the same as defined in the above formula for the polyisocyanates and $n$ is an integer from 2–10.

Suitable reactive hydrogen containing compounds combining with the polyisocyanates to form the desired polyurethanes include phenols such as phenol, cresol, xylenols, etc., secondary aromatic amines, alcohols (mono- and poly-functional), amides, lactams, mercaptans, enols and the like. Mixtures thereof can also be used to block the polyisocyanates. The preferred blocking agents are compounds with the hydroxyl group attached to the aromatic ring.

The prefered polyurethanes may be prepared by reacting the monohydric phenol with the reaction product of a polyhydric alcohol and an arylene diisocyanate. The polyhydric alcohols are in general preferably limited to compounds containing not more than 16 carbon atoms. For use in wire enamels, the polyhydric alcohols should contain preferably not more than 10 carbon atoms. Examples of these alcohols are ethylene glycol, propylene glycol, glycerol, trimethylol propane, pentaerythritol, one of the isomeric hexanetriols, etc. The monohydric phenol may be an aryl compound such as phenol, cresols, xylenols, and ethyl phenol. This class of preferred polyurethanes can be represented by the general formula:

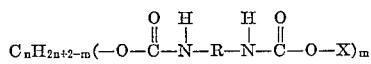

where R represents a member of the class consisting of phenylene, methylphenylene, dimethylphenylene, naphthylene, and methylnaphthylene groups, X represents a member of the class consisting of phenyl and alkyl phenyl groups, said alkyl groups containing 1–6 carbon atoms, $m$ is an integer greater than 1 but not greater than $n$, and $n$ is an integer from 2–10.

The polyvinyl acetals useful in this invention are obtained by reacting polyvinyl alcohol or a partially hydrolyzed polyvinyl ester with an aldehyde, especially formaldehyde. Polyvinyl acetals contain a certain number of hydroxyl groups and may contain a certain number of ester groups depending upon the extent of the hydrolysis and the acetalization reactions. The preferred polyvinyl formal resins contain on a weight basis 1–35% ester groups calculated as polyvinyl ester, 3–15% hydroxyl groups calculated as polyvinyl alcohol and the balance substantially formaldehyde acetal. In the commercial polyvinyl formals, the ester groups are acetate groups. Other polyvinyl acetals such as the reaction product of hydrolyzed polyvinyl esters with acetaldehyde, propionaldehyde, butyraldehyde and benzaldehyde, may also be reacted with the polyurethanes of this invention.

The melamine resins which may be used in the present wire enamel compositions can be selected from the general class of resinous aldehyde condensation products of melamine which are soluble in the organic liquids employed as solvents for the resinous components of the enamel. The useful melamine compounds include such derivatives of melamine as melam and melem. The aldehyde condensation products are well known and may be formed by reacting from 1–6 mols of the aldehyde with 1 mol of melamine. The solubility of the aldehyde melamine condensation product is generally obtained by further reacting the condensation product with an alcohol or by co-condensing the melamine and aldehyde in the presence of an alcohol.

The aldehydes which may be used are aliphatic, aromatic, cyclic and heterocyclic aldehydes including formaldehyde, acetaldehyde, propionaldehyde, butyraldehyde, isobutyraldehyde, valeraldehyde, octaldehyde, benzaldehyde, cinnamaldehyde, cyclohexanone, furfural, etc.

The alcohols which may be used include aliphatic, cycloaliphatic, aromatic, nitro, and amino alcohols such as methanol, ethanol, propanol, isopropanol, butanol, isobutanol, pentanols, octanols, lauryl alcohol, cetyl alcohol, stearyl alcohol, cyclohexanol, benzyl alcohol, cinnamyl alcohol, allyl alcohol, 2-nitro-1-butanol, 2-nitro-2-methyl-1-propanol, 2-nitro-2-methyl-1,3-propane diol, 2-nitro-2-ethyl-1,3 propane diol, tris (hydroxymethyl) nitro-methane, 2-amino-1-butanol, 2-amino-2-methyl-1-propanol, 2-amino-2-methyl-1,3-propane diol, 2-amino-2-ethyl-1,3 propane diol, tris (hydroxymethyl) amino methane etc. Mixtures of two or more alcohols may be used if desired. The amounts of alcohol reacted are generally equal to or in excess of the formaldehyde on a molar ratio.

The preferred melamine resins are the further reaction products of the melamine, aldehyde and alcohol reactants with an aryl sulfonamide. These products are also well known and may be obtained by co-condensation of all the reactants named such as taught in U.S. 2,508,875, which is hereby incorporated by reference. The useful aryl sulfonamides include benzene sulfonamide and the ring-substituted derivatives thereof, such as toluene sulfonamides, chlorobenzene sulfonamides, nitrobenzene sulfonamides, etc.

For reasons of economy and availability, it is preferred to use the co-condensation products of melamine, toluene sulfonamide, formaldehyde and butanol. The proportions of reactants may be varied between the limits of 1 mol of melamine to from 0.1 to 1.0 mol of toluene sulfonamide and from 1 to 6 or more mols of formaldehyde. An excess of the formaldehyde may be used. The toluene sulfonamides may be any of the isomeric ortho-, meta- or para-derivatives or it may be a mixture of two or more of the isomers.

To be used as a coating composition, the polyvinyl acetals, polyurethanes, phenol-aldehyde resins and melamine-aldehyde condensate resins should be dissolved in a substantially anhydrous organic solvent medium. Any non-reactive volatile mutual solvents for the resinous components may be used, such as ethylene dichloride, trichloroethylene or mixed solvent systems of alcohols, esters and hydrocarbons. For the coating of magnet wire, the solvent medium preferably contains a substantial amount of a phenol such as phenol, cresol, xylenol, and an aliphatic or aromatic hydrocarbon such as xylene, naphtha and mixtures such as the high solvency petroleum hydrocarbons used in the examples. The particular naphtha hydrocarbon mixture in the preceding examples for the preparation of the wire enamels is a mixture of aromatic liquid hydrocarbons of boiling range 150°–184° C. derived from coal tar and/or petroleum. The cresylic acid that was used is a mixture of liquid phenolic compounds consisting primarily of xylenols and cresols and having a boiling range of 195°–227° C.

The phenol-aldehyde resins which are useful in the present invention can be limited to those soluble in the solvent systems employed for the preparation of wire enamels. Such can readily be selected from the general class of heat-hardenable phenol-aldehyde resins. The phenolic portion of the resin, in addition to the meta-para-cresol used in the above examples, may also be selected from the group consisting of phenols, xylenols, mixtures of xylenols and cresols, wood-oil phenolic bodies, petro-alkyl phenols, coal-tar phenol and others. The aldehyde portion of the resin in addition to the formaldehyde used in the examples may also be paraformaldehyde, acetaldehyde or other suitable aldehydes. The preferred composition of phenol-aldehyde resin useful for wire enamels is obtained by reacting one mol of the phenolic compound selected from the group comprising meta-para-cresol and para-tertiary butyl phenol with 0.1–2.0 mols of formaldehyde.

The wire enamels of the present invention are stable indefinitely under usual storage conditions. The reaction initiates at temperatures about 150° C. with the reaction proceeding more rapidly as the temperatures increase. In the commercial type wire towers generally employed for wire enameling, it is preferred to conduct the reaction at tower operating temperatures of approximately 300° to 450° C.

The resins of this invention form valuable insulative coatings both on magnet wire and in other applications such as, for example, foil condensers. These coatings are smooth, glossy, tough, adhere well to metals, are resistant to solvents and abrasion, and are superior to conventional wire enamels in hermetic applications.

It is to be understood that the present invention is not limited to the particular wire coating compositions, applications or wire sizes described above. It is obvious from the above test results that it is possible to utilize the present coating compositions as the base coat on a wire and to apply as an overcoat one or more of the many compatible insulating varnishes and thereby obtain a coating acceptable at even higher operating temperatures. It is also obvious that the present enamels may be applied as the varnish over a base coat of less thermally resistant and solvent resistant coatings. Nor is it intended to limit the application of the resinous compositions as an electrical insulation for wire merely. The solid resinous constituents of the present invention are definitely stable as a dry mixture at room temperature. It is possible therefore by means of extrusion, dipping, casting and other known means to form insulation from such a mixture that is useful in such electrical applications as slot liners, encapsulation, sheet insulation, and surface coatings. The coating compositions shown can also be used as an adhesive or impregnating varnish for such articles as glass tapes and electrical coils. Other non-electrical uses of the compositions are apparent where chemical resistance and temperature stability of the final product are needed, such as surface coatings and others. It will be obvious to the man skilled in the art from all of the above that other compositions and applications are within the scope of this invention.

What is claimed is:

1. A coating composition comprising an organic liquid solution of 100 parts of a polyvinyl acetal, 1–150 parts of a phenol-aldehyde resin, 0.5–20 parts of a melamine-aldehyde condensate resin, 5–200 parts of a polyurethane consisting of the adduct of an organic polyisocyanate with a reactive hydrogen containing compound taken from the group consisting of phenols, secondary aromatic amines, alcohols, amides, lactams, mercaptans, enols and mixtures thereof, and 0.01–2 parts of a cure promoter selected from the class consisting of soluble metal organic compounds of tin and iron.

2. A coating composition as in claim 1 wherein the polyvinyl acetal is polyvinyl formal.

3. A coating composition as in claim 1 also containing 0.01–2 parts of a soluble tertiary amine.

4. A coating composition comprising an organic liquid solution of 100 parts of polyvinyl formal, 1–150 parts of a phenol-aldehyde resin, 0.5–20 parts of a melamine-aldehyde condensate resin, 0.01–2 parts of a cure promoter selected from the class consisting of soluble metal organic compounds of tin and iron, and 5–200 parts of a polyurethane represented by the formula:

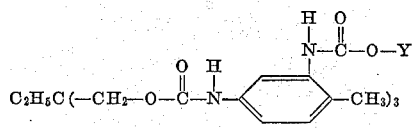

where Y is a member selected from the class consisting of phenyl, methylphenyl and dimethylphenyl groups.

5. A composition comprising the product of heating at temperatures over 150° C. 100 parts of a polyvinyl acetal, 1–150 parts of a phenol-aldehyde resin, 0.5–20 parts of a melamine-aldehyde condensate resin, 5–200 parts of a polyurethane consisting of the adduct of an organic polyisocyanate with a reactive hydrogen containing compound taken from the group consisting of phenols, secondary aromatic amines, alcohols, amides, lactams, mercaptans, enols and mixtures thereof, and 0.01–2 parts of a cure promoter selected from the class consisting of soluble metal organic compounds of tin and iron.

6. A composition as in claim 5 wherein the polyvinyl acetal is polyvinyl formal.

7. A composition comprising the product of heating at temperatures over 150° C. 100 parts of polyvinyl formal, 5–70 parts of phenol-aldehyde resin, 1–10 parts of a melamine-formaldehyde condensate resin, 40–80 parts of a polyurethane consisting of the adduct of an organic polyisocyanate with a reactive hydrogen containing compound taken from the group consisting of phenols, secondary aromatic amines, alcohols, amides, lactams, mercaptans, enols and mixtures thereof and 0.03–0.5 part of a cure promoter selected from the class consisting of soluble metal organic compounds of tin and iron.

8. A composition comprising the product of heating at temperatures over 150° C. 100 parts of polyvinyl formal, 5–70 parts of a phenol-aldehyde resin, 1–10 parts of a melamine-formaldehyde condensate resin, 40–80 parts of a polyurethane consisting of the adduct of an organic polyisocyanate with a reactive hydrogen containing compound taken from the group consisting of phenols, secondary aromatic amines, alcohols, amides, lactams, mercaptans, enols and mixtures thereof, 0.03–0.5 part of a cure promoter selected from the class consisting of soluble metal organic compounds of tin and iron and 0.03–0.5 part of a soluble tertiary amine.

9. A composition comprising the reaction product of heating at temperatures over 150° C. an organic liquid solution of solids in the proportion of 100 parts of polyvinyl formal, 1–10 parts of a melamine-formaldehyde condensate resin, 5–70 parts of a phenol-aldehyde resin, 0.03–0.5 part of a cure promoter selected from the class consisting of soluble metal organic compounds of tin and iron, and 40–80 parts of a polyurethane represented by the formula:

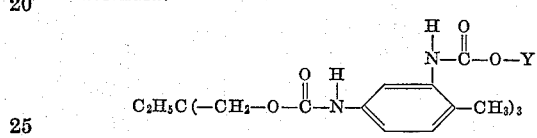

where Y is a member selected from the class consisting of phenyl, methylphenyl and dimethylphenyl groups.

10. A composition comprising the reaction product of heating at temperatures over 150° C. an organic liquid solution of solids in the proportions of 100 parts of polyvinyl formal, 5 parts of a phenol-aldehyde resin, 5 parts of a melamine-formaldehyde condensate resin, 0.05 part dibutyltin dilaurate, 0.05 part triethylenediamine, and 60 parts of a polyurethane represented by the formula:

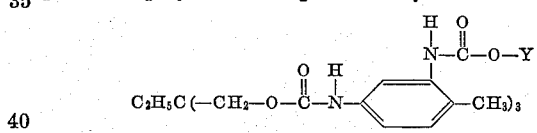

where Y is a member of the class consisting of phenyl, methylphenyl and dimethylphenyl groups.

11. A process for preparing a resinous composition which comprises heating at temperatures over 150° C. an organic liquid solution containing solids in the proportion of 100 parts of polyvinyl formal, 1–150 parts of a phenol-aldehyde resin, 0.5–20 parts of a melamine-aldehyde condensate resin, 5–200 parts of a polyurethane consisting of the adduct of an organic polyisocyanate with a reactive hydrogen containing compound taken from the group consisting of phenols, secondary aromatic amines, alcohols, amides, lactams, mercaptans, enols and mixtures thereof, and 0.01–2 parts of a cure promoter selected from the class consisting of soluble metal organic compounds of tin and iron.

12. A process for insulating wire which comprises coating the wire with an organic liquid solution somprising 100 parts of polyvinyl formal, 1–150 parts of a phenol-aldehyde resin, 0.5–20 parts of a melamine-aldehyde condensate resin, 5–200 parts of a polyurethane consisting of the adduct of an organic polyisocyanate with a reactive hydrogen containing compound taken from the group consisting of phenols, secondary aromatic amines, alcohols, amides, lactams, mercaptans, enols and mixtures thereof, and 0.01–2 parts of a cure promoter selected from the class consisting of soluble metal organic compounds of tin and iron, removing the solvent from the coating and curing the coating on the wire at temperatures over 150° C.

13. Electrical insulation comprising the product of heating at temperatures above 150° C. 100 parts of polyvinyl formal, 1–150 parts of a phenol-aldehyde resin, 0.5–20 parts of a melamine-aldehyde condensate resin, 5–200 parts of a polyurethane consisting of the adduct of an organic polyisocyanate with a reactive hydrogen containing compound taken from the group consisting of phenols, secondary aromatic amines, alcohols, amides, lactams, mercaptans, enols and mixtures thereof, and 0.01–2 parts of a cure promoter selected from the class consisting of soluble metal organic compounds of tin and iron.

14. An electrical conductor insulated with an organic insulation comprising the product of heating at above 150° C. 100 parts of polyvinyl formal, 1–150 parts of a phenol-aldehyde resin, 0.5–20 parts of a melamine-aldehyde condensate resin, 5–200 parts of a polyurethane consisting of the adduct of an organic polyisocyanate with a reactive hydrogen containing compound taken from the group consisting of phenols, secondary aromatic amines, alcohols, amides, lactams, mercaptans, enols and mixtures thereof, and 0.01–2 parts of a cure promoter selected from the class consisting of soluble metal organic compounds of tin and iron.

15. A coated electrical conductor consisting of a bare metal wire and a coating comprising the product of heating at temperatures above 150° C. 100 parts of polyvinyl formal, 1–150 parts of a phenol-aldehyde resin, 0.5–20 parts of a melamine-aldehyde condensate resin, 20–200 parts of a polyurethane consisting of the adduct of an organic polyisocyanate with a reactive hydrogen containing compound taken from the group consisting of phenols, secondary aromatic amines, alcohols, amides, lactams, mercaptans, enols and mixtures thereof, and 0.01–2 parts of a cure promoter selected from the class consisting of soluble metal organic compounds of tin and iron.

16. An electrically insulating varnish comprising the composition of claim 1.

References Cited in the file of this patent

UNITED STATES PATENTS

| | | |
|---|---|---|
| 2,402,075 | Novotny et al. | June 11, 1946 |
| 2,409,548 | Debacher | Oct. 15, 1946 |
| 2,430,479 | Pratt et al. | Nov. 11, 1947 |
| 2,454,678 | Smith et al. | Nov. 23, 1948 |
| 2,730,466 | Daszewski | Jan. 10, 1956 |

FOREIGN PATENTS

| | | |
|---|---|---|
| 594,001 | Great Britain | Oct. 30, 1947 |
| 206,454 | Australia | Feb. 20, 1957 |